March 24, 1936.  G. B. SNOW  2,035,100

GEAR SHIFT FOR AUTOMOBILES

Filed Oct. 24, 1934  2 Sheets-Sheet 1

*Greer Blackburn Snow*
INVENTOR

BY

ATTORNEY

March 24, 1936.  G. B. SNOW  2,035,100

GEAR SHIFT FOR AUTOMOBILES

Filed Oct. 24, 1934   2 Sheets-Sheet 2

Greer Blackburn Snow
INVENTOR

BY

ATTORNEY

Patented Mar. 24, 1936

2,035,100

UNITED STATES PATENT OFFICE 2,035,100

GEAR SHIFT FOR AUTOMOBILES

Greer Blackburn Snow, Amelia Court House, Va.

Application October 24, 1934, Serial No. 749,714

1 Claim. (Cl. 74—337.5)

This invention relates to gear shifts for automobiles, it is adapted to eliminate the usual speed changing mechanism, in the form of a lengthy lever, now employed in the usual automobile.

One of the objects of this invention is a provision of a device adapted to shift gears of an automobile by means of a dial.

Another object of this invention is provision of a device adapted for shifting the gears by a dial convenient to an operative and thereby eliminating the usual lever now employed.

Figure 1:
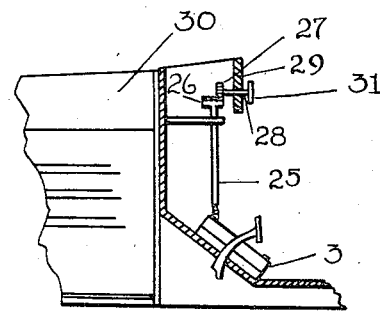
Figure 7:
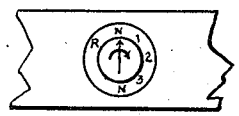
Figure 2:
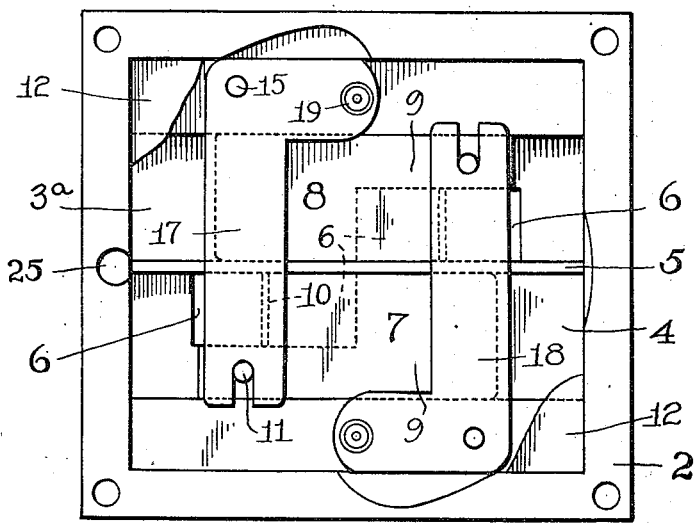
Figure 6:
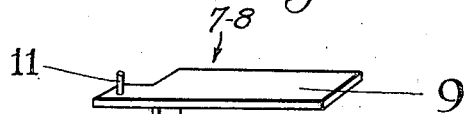
Figure 3:
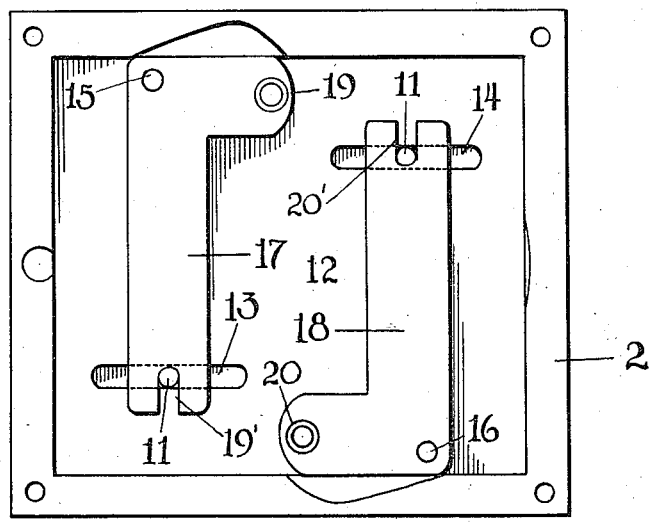
Figure 5:
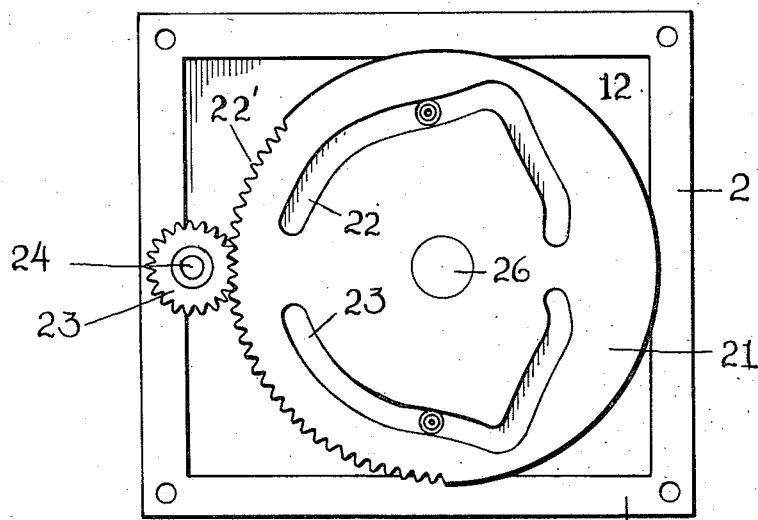
Figure 4:
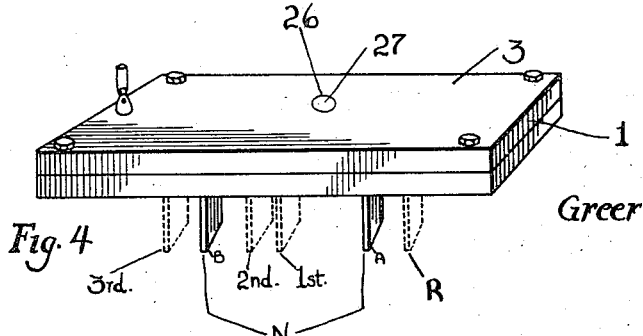

Other objects and features will more fully appear from the following descriptions and accompanying drawings in which:

Fig. 1 is a partial elevational sectional view of the device in an automobile; Fig. 2, a top plan view with one element removed; Fig. 3, a top plan view; Fig. 4, a perspective side view; Fig. 5, a top plan view with the cover removed; Fig. 6, a perspective of an angular member, and Fig. 7, a sectional view showing a dial on dash-board of automobile.

Referring to the drawings, a housing 1 consisting of a base 2, and top 3 is provided with a pair of parallel grooves respectively numbered 3ª and 4, the grooves are divided by a partition 5, and each having therein, respectively, apertures 6 into which angular members, respectively numbered 7 and 8 (as shown in Fig. 6 of the drawings) operate.

The angular members are respectively provided with a body 9 having extending therefrom, at right angles, a tooth 10 and a pin 11 projects upwardly from said body.

A plate 12 (as shown in Fig. 3, but which has been omitted in Fig. 2 for purposes of clarity) is adapted to cover said angular members and form a compartment in which they freely actuate. The plate is provided with slots 13 and 14 through which the pins 11 extend. Pivots 15 and 16 are respectively adapted to engage bars 17 and 18 of said angular members. Said bars are provided with recesses 19' and 20' into which pins 11 are disposed.

Bearings 19 and 20 respectively engage the end of bars 17 and 18. A wheel 21 is provided with a pair of tracks 22 and 23 into which said bearings are disposed and actuate respectively therein in cam-like fashion. The periphery of said wheel is partially provided with a plurality of teeth 22' adapted to mesh with pinion 23 having an axle 24 disposed in an aperture 25 in said base. An axle 26 protrudes from the center of said wheel and engages an aperture 27 in said top, bolts 28 adapted to secure said top and bottom together.

The axle 24 may be secured to a rod 25 provided with a gear 26 that is adapted to mesh with a pinion 27 having a shaft 28 extending through a dash-board 29 of an automobile 30. On the end of shaft 28 is a dial 31 and symbols on said dial may be placed in operative relation to symbols on said dash-board.

The device operates as follows: In order to start the automobile moving, the engine, of course, is started, the clutch pedal (see Fig. 1) is depressed, and if it is desired to go forward, the dial 31 is moved in clockwise direction, which causes the wheel 21 to move in anti-clockwise direction thereby causing angular member A (see Fig. 4) to move to dotted line position 1st, thereby shifting the gears (not shown) to the first speed; the member B (Fig. 4) remains in neutral during this action; when the dial is turned to 2 (Fig. 7), after depressing clutch, the member B, through the cam-like action, is shifted from neutral, indicated by N in Fig. 4, to 2nd, while member A returns to neutral from 1st; this movement thereby shifting the automobile gears to 2nd speed, and by turning the dial to third, after depressing clutch, the member B is caused to move (by cam-like action of wheel) from 2nd to N (neutral) thence to third; while member A remains in neutral. If it is desired to throw the gears in reverse, the clutch is depressed and the dial turned anti-clockwise (Fig. 7) to R, which causes member A to move to R, while member B remains in neutral position. It is to be understood, of course, that in each shift of gears, the clutch is depressed first, the dial turned to the desired gear speed, and then the clutch released. It is obvious from the foregoing that the turning of the dial sets the angular members at a particular speed.

Having described this invention, what is claimed is:

In a device of the character described consisting of a housing having a base and a top; a pair of parallel grooves in said base; a pair of members respectively disposed in said groove; a plate provided with a pair of apertures respectively adapted to register with pins on said members; a toothed wheel rotatable in said housing; a pair of diametrically opposed tracts in said wheel; angular members pivotally connected in said housing and respectively in operative relation with said wheel and pins.

GREER BLACKBURN SNOW.